April 20, 1965   L. KARL   3,179,008
PROJECTOR WITH EXTRACTABLE SLIDE CARRIER
Filed Sept. 7, 1962
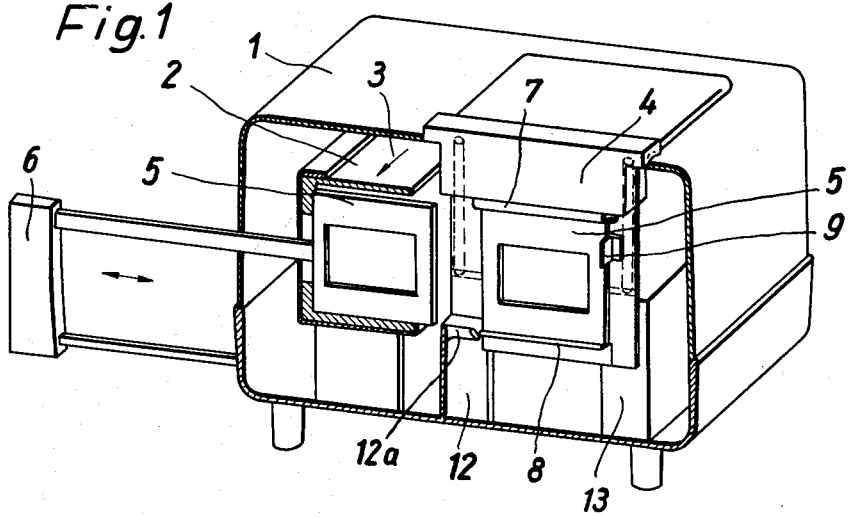
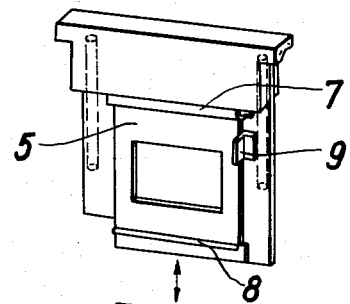
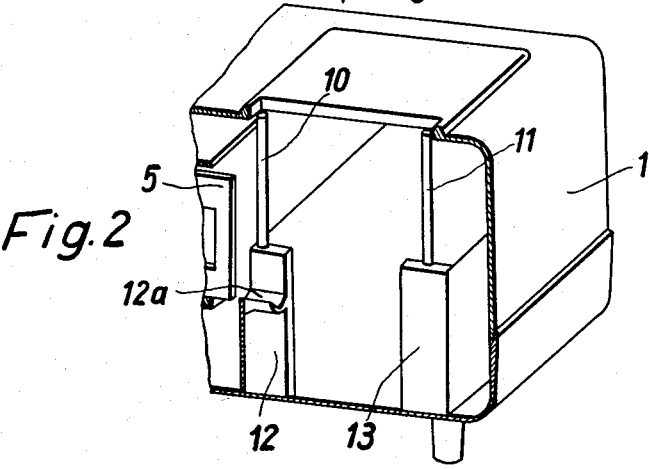

3,179,008
PROJECTOR WITH EXTRACTABLE
SLIDE CARRIER
Leopold Karl, Unterdurrbach uber Wurzburg, Germany, assignor to Kindermann & Co. G.m.b.H., Ochsenfurt (Main), Germany
Filed Sept. 7, 1962, Ser. No. 221,993
Claims priority, application Germany, Sept. 15, 1961, K 44,725
5 Claims. (Cl. 88—28)

This invention relates to a projector having a slide magazine receiving a large number of diapositives from which the latter can be pushed into the slide carrier by a slide changer movable transversely to the direction of advance of the magazine.

When slides are shown with projectors of the magazine type is occasionally occurs that some slides which have been incorrectly positioned in the magazine appear upside down or the wrong way round when projected. In order to correct this fault it is necessary in known projectors to return the slide in question from the slide carrier to the magazine, then to withdraw the magazine from the projector, turn the slide in question around—which is entirely impossible without lengthy searching if corresponding numbering is provided—and then to return the magazine to its previous position in the projector. It is obvious that this complicated correction procedure constitues a decisive disadvantage in the practical handling of the projector.

The invention therefore aims at avoiding the disadvantages of known constructions by providing a projector of the type initially specified in which slides which are upside down or the wrong way round when projected can be brought into the correct position by a few operations, and in particular without withdrawing the slide magazine from the projector.

According to the invention this aim is achieved by constructing the slide carrier as a slidable changing device and making it extractable from the projector casing independently of the magazine, with or without a slide.

Whereas in known projectors the slide carrier in which the slide is positioned during projection is fixed in the casing of the projector, in the projector according to the invention it can be extracted by a single operation in order to place a wrongly positioned slide in the correct position. During this time the magazine remains unchanged in its previous position.

The projector according to the invention also affords the additional advantage that with the aid of the extractable slide carrier changing device individual slides which are not disposed in a magazine can be shown out of turn.

These and further details of the invention will be clear from the following description of one exemplary embodiment which is illustrated in the accompanying drawings, and in which:

FIGURE 1 shows an elevation in perspective of the cut-through projector,

FIGURE 2 a partial elevation, likewise in perspective, of the projector with the slide carrier changing device extracted, and FIGURE 3 an elevation in perspective of the slidable changing device.

In the drawing the new projector is illustrated only to the extent required for the understanding of the principle of the invention.

The projector casing 1 contains the magazine 2, which can be moved step by step in the direction of the arrow 3 by means of a transport device (not illustrated).

In the casing 1 a slide carrier 4 is also provided which is constructed as a slidable changing device adapted to be extracted in the upward direction from the projector casing.

In order to push the slides 5 contained in the magazine 2 into the slide carrier 4, a slide changer 6 is provided which is movable transversely to the direction of advance of the magazine 2 and through an arm (not illustrated) also returns the slides 5 from the slide carrier 4 into the magazine 2.

The slide carrier changing device 4 has an upper guide 7 and a lower guide 8 for the slide 5 and also a lateral stop 9 which when the slide 5 is moved out of the magazine 2 into the slide carrier determines the end position of the slide. On the side facing the magazine 2 the slide carrier changing device 4 is open so that the slide 5 can be immediately displaced in the lateral direction.

The slide carrier changing device 4 is mounted in the projector casing 1 on two guide bolts 10, 11 which are fastened on cross-members 12, 13 of the projector chassis. The cross-member 12 also carries a guide groove 12a which facilitates the pushing of the slide 5 from the magazine 2 into the slide carrier and its extraction therefrom.

From the above explanation of the projector according to the invention the previously mentioned essential advantages of the slide carrier constructed as a slidable changing device should be immediately clear. If in fact one of the slides 5 contained in the magazine 2 should by mistake be upside down or the wrong way round, it is not necessary to remove the entire magazine 2 from the projector for the purpose of bringing this slide into its correct position, but it is sufficient merely to pull the slidable changing device 4 upwards, turn the slide in question over, and reinsert the slidable changing device into the projector.

With the new slide carrier constructed as a slidable changing device it is also possible to project slides out of turn, that is to say independently of the magazine, without for this purpose having to remove the magazine from the projector.

What I claim is:

1. In a slide projector assembly of the type having a casing, a projector means therein, a multiple slide magazine mounted in the casing for movement parallel to the optical axis of the projector means and provided with an open longitudinal side toward the optical axis, a slide changer, means movably mounting the slide changer in the casing for reciprocation at right angles to the direction of movement of the slide magazine, said slide changer having elements enterable through openings of the magazine for engaging a slide therein for moving the slide through the open longitudinal side of the magazine to the projection position and for returning the slide to the magazine, and mechanism operable in response to the completion of each operation cycle of the slide changer advancing the magazine to position a succeeding slide in the plane of movement of the slide changer, such mechanism including a changing means mounted in the optical axis in the plane of movement of the slide changer and holding the slide in the projecting position, said changing means being provided with an open side facing the magazine so that the slides are movable by the slide changer from the magazine to the changing means and said changing means being displaceable from the projection position independently of the magazine either with or without a slide.

2. The slide projector assembly as claimed in claim 1, in which said changing means is defined by a slidable device adapted to be movable in an upward direction through an aperture in the top of said casing.

3. The slide projector assembly as claimed in claim 1, in which said changing means is defined by a slidable device adapted to be movable in an upward direction through an aperture in the top of said casing, upper and lower guides on said device, and a stop on said device at the side remote from said magazine, with said guides engaging the upper and lower edges of a slide and the stop determining the end position of the slide.

4. The slide projector assembly as claimed in claim 1, in which said changing means is defined by a slidable device adapted to be movable in an upward direction through an aperture in the top of said casing, and a pair of vertical bolts carried by said casing and on which said slidable device is movable.

5. The slide projector assembly as claimed in claim 1, in which said changing means is defined by a slidable device adapted to be movable in an upward direction through an aperture in the top of said casing, upper and lower guides on said device, a stop on said device at the side remote from the magazine, with said guides engaging the upper and lower edges of a slide and the stop determining the end position of the slide, a pair of cross members on the casing, a vertical bolt supported by each cross member and on which said slidable device is movable, and the cross member closest to the magazine having a horizontally extending guide groove for the lower edge of a slide when the slide changer moves the slide to the projection position.

References Cited by the Examiner
UNITED STATES PATENTS

| | | | |
|---|---|---|---|
| 2,940,197 | 6/60 | Jorgensen | 40—79 |
| 2,990,750 | 7/61 | Zillmer | 88—28 |

NORTON ANSHER, *Primary Examiner.*

WILLIMA MISIEK, *Examiner.*